(12) United States Patent
Thirumalai et al.

(10) Patent No.: US 7,814,107 B1
(45) Date of Patent: Oct. 12, 2010

(54) GENERATING SIMILARITY SCORES FOR MATCHING NON-IDENTICAL DATA STRINGS

(75) Inventors: Srikanth Thirumalai, Clyde Hill, WA (US); Egidio Terra, Porto Alegre (BR); Vijai Mohan, Bellevue, WA (US); Mark J. Tomko, Seattle, WA (US); Grant M. Emery, Seattle, WA (US); Aswath Manoharan, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 385 days.

(21) Appl. No.: 11/754,241

(22) Filed: May 25, 2007

(51) Int. Cl.
G06F 7/00 (2006.01)
G06F 17/00 (2006.01)
(52) U.S. Cl. ...................... 707/749; 707/750
(58) Field of Classification Search .............. 707/3, 707/5, 6, 102, 749, 750; 715/246; 704/7, 704/9, 257
See application file for complete search history.

(56) References Cited

U.S. PATENT DOCUMENTS

| | | | |
|---|---|---|---|
| 4,849,898 A | | 7/1989 | Adi |
| 5,062,074 A | * | 10/1991 | Kleinberger .................... 707/5 |
| 5,261,112 A | * | 11/1993 | Futatsugi et al. ............ 715/246 |
| 5,835,892 A | * | 11/1998 | Kanno ........................ 704/257 |
| 5,960,383 A | | 9/1999 | Fleischer |
| 6,038,561 A | | 3/2000 | Snyder |
| 6,075,896 A | * | 6/2000 | Tanaka ....................... 382/229 |
| 6,076,086 A | * | 6/2000 | Masuichi et al. ................ 707/3 |
| 6,167,398 A | | 12/2000 | Wyard |
| 6,173,251 B1 | * | 1/2001 | Ito et al. ......................... 704/7 |
| 6,263,121 B1 | | 7/2001 | Melen |
| 6,606,744 B1 | | 8/2003 | Mikurak |
| 6,810,376 B1 | * | 10/2004 | Guan et al. ..................... 704/9 |

(Continued)

FOREIGN PATENT DOCUMENTS

EP 1380966 A2 * 1/2004

OTHER PUBLICATIONS

Ghahramani, Z., and K.A. Heller, "Bayesian Sets," in Y. Weiss et al. (eds.), "Advances in Neural Information Processing Systems 18 (Proceedings of the 2005 Conference)," MIT Press, May 2006, 8 pages.

(Continued)

*Primary Examiner*—James Trujillo
*Assistant Examiner*—Pavan Mamillapalli
(74) *Attorney, Agent, or Firm*—Christensen O'Connor Johnson Kindness PLLC

(57) ABSTRACT

A system and method for determining the likelihood of two documents describing substantially similar subject matter is presented. A set of tokens for each of two documents is obtained, each set representing strings of characters found in the corresponding document. A matrix of token pairs is determined, each token pair comprising a token from each set of tokens. For each token pair in the matrix, a similarity score is determined. Those token pairs in the matrix with a similarity score above a threshold score are selected and added to a set of matched tokens. A similarity score for the two documents is determined according to the scores of the token pairs added to the set of matched tokens. The determined similarity score is provided as the likelihood that the first and second documents describing substantially similar subject matter.

29 Claims, 12 Drawing Sheets

U.S. PATENT DOCUMENTS

| | | | |
|---|---|---|---|
| 6,961,721 | B2 | 11/2005 | Chaudhuri |
| 7,113,943 | B2 | 9/2006 | Bradford |
| 7,346,839 | B2 | 3/2008 | Acharya |
| 7,386,441 | B2 * | 6/2008 | Kempe et al. .................. 704/9 |
| 7,426,507 | B1 | 9/2008 | Patterson |
| 7,529,756 | B1 | 5/2009 | Haschart |
| 7,562,088 | B2 | 7/2009 | Daga |
| 7,567,959 | B2 | 7/2009 | Patterson |
| 7,599,914 | B2 | 10/2009 | Patterson |
| 7,603,345 | B2 | 10/2009 | Patterson |
| 2002/0016787 | A1 | 2/2002 | Kanno |
| 2003/0065658 | A1 | 4/2003 | Matsubayashi |
| 2003/0101177 | A1 * | 5/2003 | Matsubayashi et al. ........ 707/6 |
| 2006/0112128 | A1 * | 5/2006 | Brants et al. ................ 707/102 |
| 2006/0282415 | A1 * | 12/2006 | Shibata et al. ................. 707/3 |

OTHER PUBLICATIONS

"Google™ Sets," © 2007 Google, <://labs.google.com/sets> [retrieved Feb. 13, 2008].

Bilenko, M., et al., "Adaptive Name Matching in Information Integration," IEEE Intelligent Systems 18(5): Sep./Oct. 16-23, 2003.

Kilgarriff, A., "Using Word Frequency Lists to Measure Corpus Homogeneity and Similarity Between Corpora," Information Technology Research Institute Technical Report Series, ITRI-97-07, University of Brighton, U.K., Aug. 1997, 16 pages.

Ramos, J., "Using TF-IDF to Determine Word Relevance in Document Queries," Proceedings of the First Instructional Conference on Machine Learning (iCML-2003), Piscataway, N.J. Dec. 3-8, 2003, 4 pages.

\* cited by examiner

GENERATING SIMILARITY SCORES FOR MATCHING NON-IDENTICAL DATA STRINGS

BACKGROUND

One aspect associated with the widespread usage of networks generally, and the Internet particularly, has been the emergence of electronic marketplaces. An electronic marketplace is typically a network site that offers a consistent, seemingly united, electronic storefront to networked consumers. Typically, the electronic marketplace is hosted on the Internet as one or more Web pages, and viewed by a consumer via a networked computer. FIG. 1 is a pictorial diagram of an illustrative networked environment 100 that includes an electronic marketplace. In particular, the networked environment 100 includes a host server 102 that hosts the electronic marketplace 104. As indicated above, a typical electronic marketplace is comprised of one or more Web pages that are viewable on a consumer's computer via a Web browser. However, for illustration purposes, the electronic marketplace 104 is shown in FIG. 1 as residing "outside" of a client computer. Consumer computers, such as consumer computers 106-108, connect to the host server to access the electronic marketplace via a network 110, such as, but not limited to, the Internet. The electronic marketplace 104 allows consumers, via their client computers 106-108, to view and purchase items offered for sale or lease on the electronic marketplace.

In many instances, an electronic marketplace 104 includes items from many different vendors or suppliers. For example, as shown in FIG. 1, the electronic marketplace 104 offers items from vendors 112 and 114. Still further, these electronic marketplaces allow individuals to offer both new and used items to consumers via the electronic marketplace. To do so, the vendors/suppliers 112-114, as well as consumers, such as a consumer operating consumer device 108, provide descriptions of products to be offered on the electronic marketplace 104 to the host server 102. The illustrated descriptions include descriptions 120-124.

Naturally, if an item is offered through the electronic marketplace 104, all instances of that item from all vendors should be displayed to the consumer as various options of the same item rather than individual items that are viewed separately. Unfortunately, since individual vendors and consumer/sellers provide the host server 102 with their own descriptions of the products that they wish to sell, it becomes an onerous, manual task to determine which product descriptions reference the same items and which reference different items. For example, FIGS. 2A-2C present illustrative product description documents submitted from two separate vendors. As suggested by the illustration, document 202 of FIG. 2A includes a structured or fielded document with information organized in a structure, such as manufacturer 204, model number 206, screen size 208, case color 210, and a brief description 212. Document 220 of FIG. 2B is not structured or fielded, but rather a free-form paragraph description (typical of product descriptions provided by consumers) that includes important information. With regard to documents 202 and 220, and upon inspection of the two documents, a person familiar with the subject matter of laptops (or even one not quite so familiar) is likely to recognize that these two documents likely describe the same product. In other words, a person would recognize that the manufacturer ("HP") identified in the manufacturer field 204 and the name "Hewlett Packard" in text area 222 are a reference to the same manufacturer. Similarly, a person would likely recognize that the case color "BLK/SLVR" in the case color field 210 is the abbreviation for "Black/Silver" as recited in full in text area 224. From comparisons of other terms/fields, while not necessarily resulting in a letter-perfect match, a person would recognize the two documents as being substantially similar, i.e., describing the same or substantially the same product or subject matter. Moreover, if these descriptions were properly identified as duplicates (i.e., that the subject matter described by both documents is the same), a host server 102 would group them together as descriptions of a single product item.

Document 230 of FIG. 2C is a structured document and includes fields that are very similar to that of document 202. However, in contrast to document 202 (and to document 220), there are certain differences between the two that a person would likely recognize and conclude that they describe different products. For example, the case color field 232 recites "BLK/SLVR/GLD," adding an additional color to the case. Additionally, the product description 234 includes additional language, "limited edition," in text area 236 that would indicate that this laptop, in contrast to the one described in document 202, is somewhat different (i.e., a limited edition version) and not a duplicate.

Unfortunately, while a person can be trained to discern the differences between duplicate product descriptions, especially in regard to abbreviations and misspellings, it is difficult for a computer to programmatically analyze two documents to determine whether or not they are duplicates (i.e., whether or not they describe the same product). Clearly, this problem is exacerbated when the number of products offered by an electronic marketplace 104 (originating from a myriad of vendors) is measured in hundreds of thousands or more.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

According to one embodiment of the disclosed subject matter, a method for determining the likelihood of two documents describing substantially similar subject matter is presented. A set of tokens for each of two documents is obtained, each set representing strings of characters found in the corresponding document. A matrix of token pairs is determined, each token pair comprising a token from each set of tokens. For each token pair in the matrix, a similarity score is determined. Those token pairs in the matrix with a similarity score above a threshold score are selected and added to a set of matched tokens. A similarity score for the two documents is determined according to the scores of the token pairs added to the set of matched tokens. The determined similarity score is provided as the likelihood that the first and second documents describing substantially similar subject matter.

According to additional embodiments of the disclosed subject matter, a computer system for determining the likelihood that a first and second document describe substantially similar subject matter, is presented. The computer system comprises at least a processor and a memory. Moreover, the computer system is configured to obtain a set of tokens for each of the first and second documents. Each set of tokens represents a series of characters found in its corresponding document. The computer system further provides a matrix of token pairs. With regard to the token pairs, each token pair comprises a first token from the set of tokens corresponding to the first document and a second token from the set of tokens corresponding to the second document. After providing the matrix of token pairs, the computer system is configured to generate a similarity score for each token pair in the matrix. Thereafter, the computer system identifies those token pairs in the matrix with a similarity score above a threshold score and adds the identified token pairs to a set of matched tokens. The computer system is further configured to determine a similarity score for the first and second documents according to the scores of the token pairs in the set of matched tokens. Still further, the computer system provides the determined similarity score as the likelihood of the first and second documents describing substantially similar subject matter.

According to still further aspects of the disclosed subject matter, a tangible computer-readable medium system bearing computer-executable instructions is presented. When executed on a computer system, the computer-executable instruction configure the computer system to carry out a method for determining the likelihood of two documents describing substantially similar subject matter. A set of tokens for each of two documents is obtained, each set representing strings of characters found in the corresponding document. A matrix of token pairs is determined, each token pair comprising a token from each set of tokens. For each token pair in the matrix, a similarity score is determined. Those token pairs in the matrix with a similarity score above a threshold score are selected and added to a set of matched tokens. A similarity score for the two documents is determined according to the scores of the token pairs added to the set of matched tokens. The determined similarity score is provided as the likelihood that the first and second documents describing substantially similar subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

By way of definition, a document corpus refers to a collection of documents. As used in this description, a document is a body of text generally directed to describing a particular subject matter. A typical, exemplary document might be a product description of digital camera, where the product description includes the camera's manufacturer, a product number, various technical features, cosmetic features, and the like. A document corpus may be stored in one or more data stores or catalogues. In the following discussion, the referred-to document corpus is a collection of product descriptions of products offered for sale by various providers. The product descriptions are generally provided to a host server 102 conducting an electronic marketplace 104 for consumers.

By way of further definition, while the following discussion will frequently be made in regard to determining whether a first document is substantially similar to another document in a document corpus and therefore considered a duplicate, this is a shorthand reference to determining whether the subject matter described by a first document is the same or substantially the same subject matter described by another document in the document corpus. As suggested above, for purposes of simplicity and clarity in describing the disclosed subject matter, when the subject matter described by one document is the same or substantially similar to the subject matter described by another document or documents, these documents are said to be "duplicates."

Generally speaking, there are two aspects for determining whether or not a given document is substantially similar to another document in the document corpus (i.e., the subject matter described by a first document is the same as the subject matter described by another document): identification and precision. Identification refers to identifying documents in the document corpus that are candidate duplicate documents. Precision refers to the accuracy of identifying only true duplicates of a given document. Quite frequently, in order to ensure that actual or true duplicates for a first document are found among the documents in a document corpus, it is often desirable to be "aggressive" in selecting candidate duplicate documents such that there are several candidates that are not duplicates, i.e., false positives. Stated differently, identification should select a duplicate (provided a duplicate exists in the document corpus) nearly 100% of the time, at the expense of including candidate documents that are not true duplicates. According to aspects of the disclosed subject matter, to improve the precision (i.e., the accuracy of identifying only true duplicates), after aggressively identifying candidate documents, filters may be applied to "weed out" the non-duplicate candidate documents.

Figure 1:
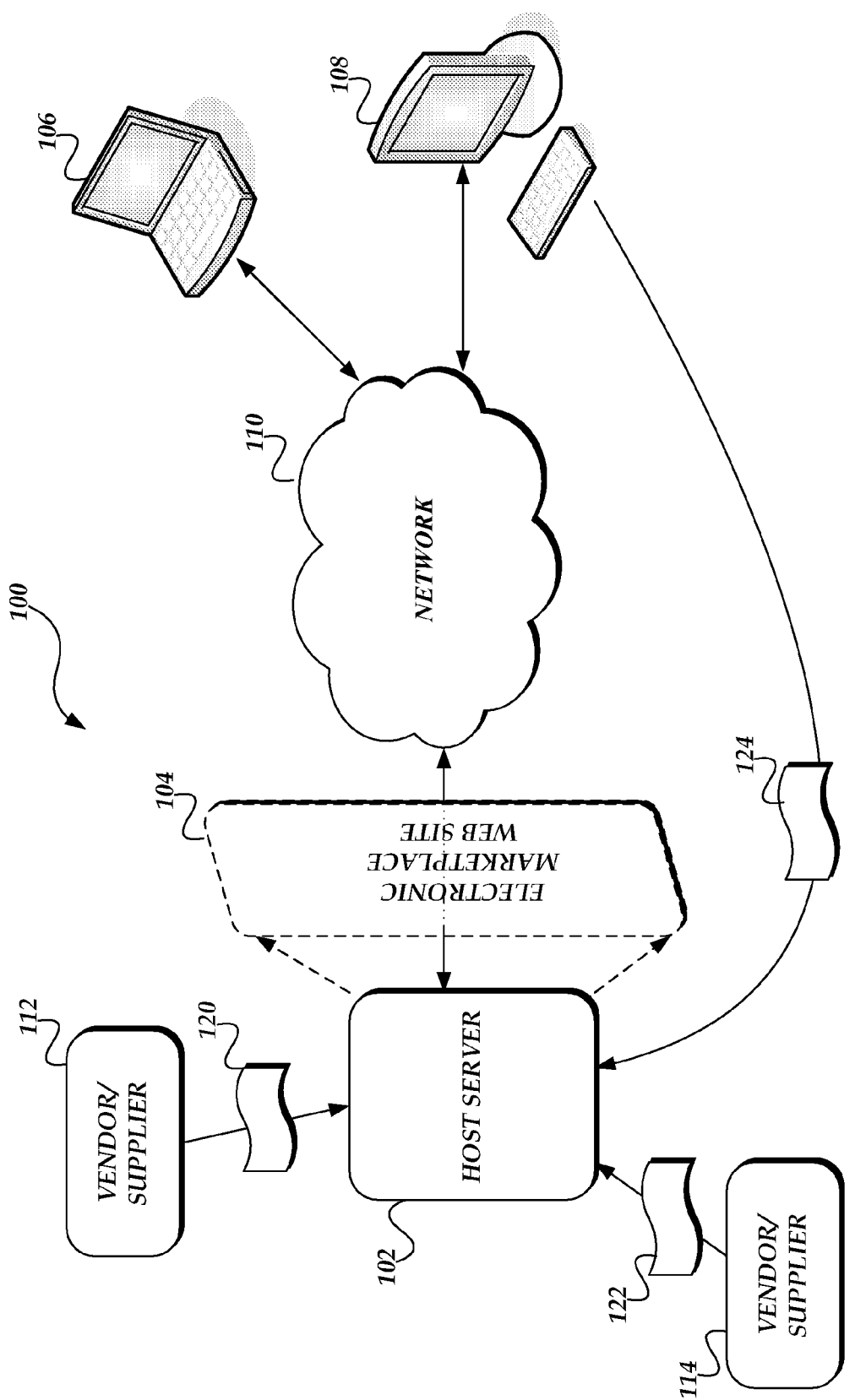
FIG. 1 is a pictorial diagram of an illustrative networked environment providing an electronic marketplace.
Figure 2:
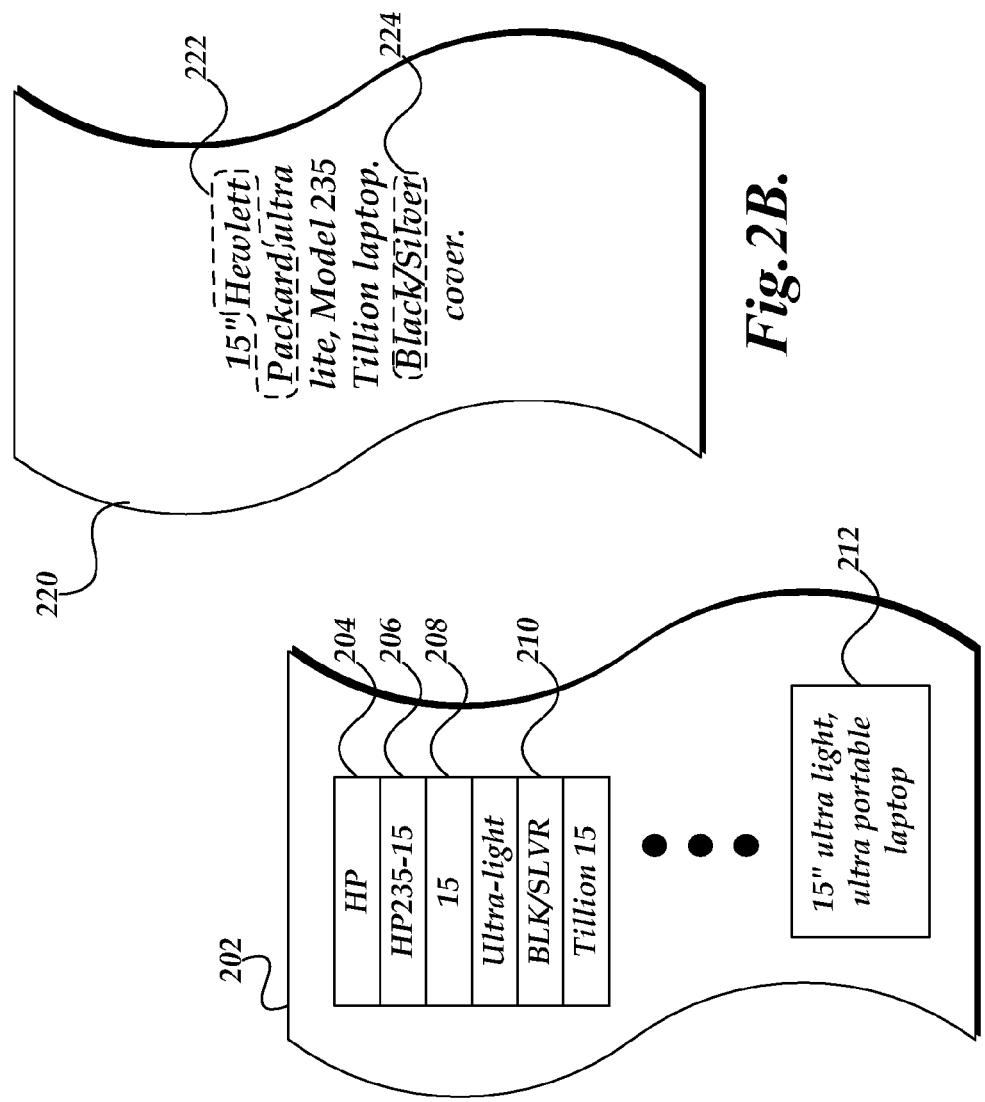
FIGS. 2A-2C are representative document descriptions regarding products from vendors, suitable for illustrating documents describing similar and dissimilar products.
Figure 3:
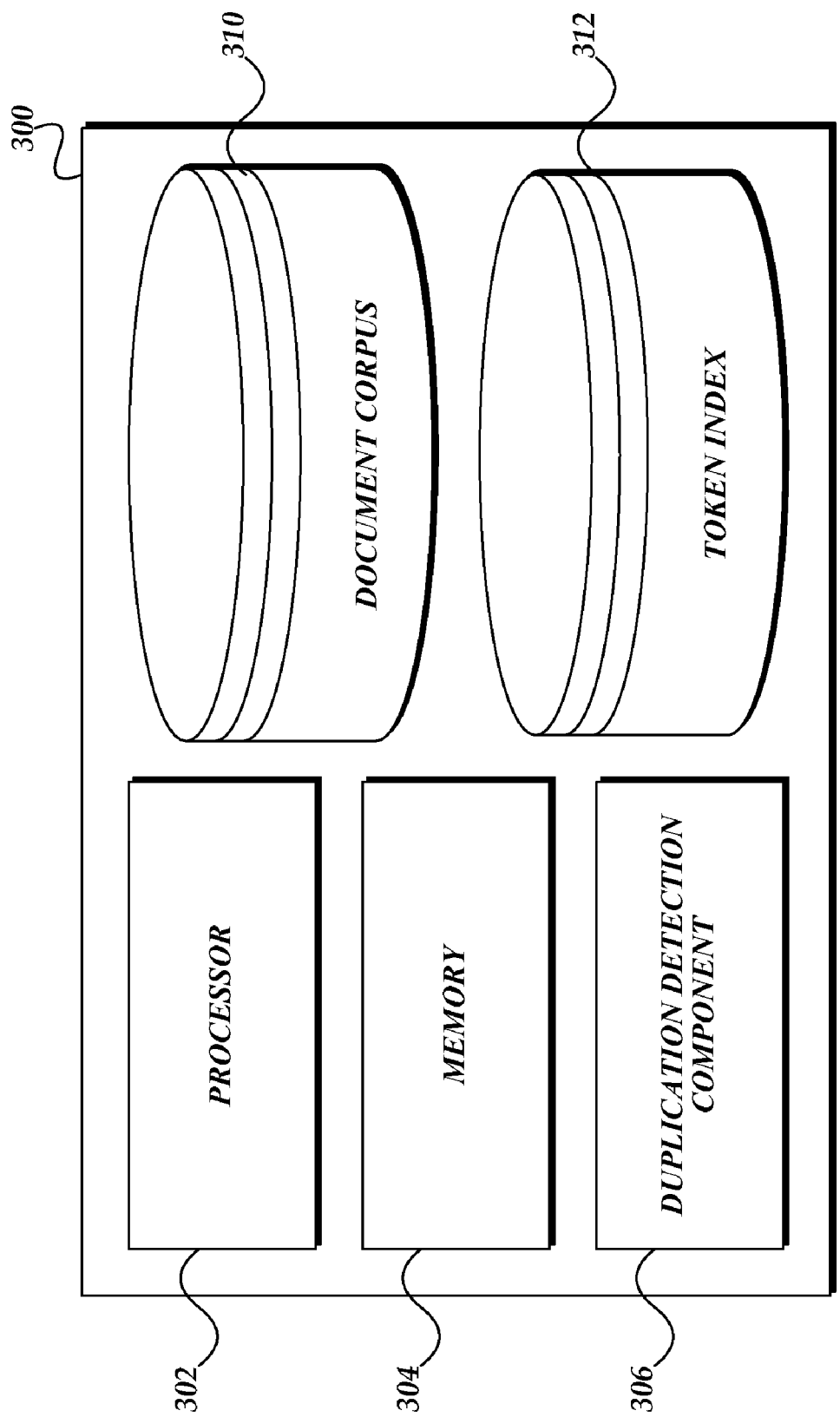
FIG. 3 is a block diagram illustrating logical components of a computer system suitable for determining whether a submitted document is substantially similar to another document and therefore considered a duplicate, in accordance with one or more embodiments of the disclosed subject matter.

FIG. 3 is a block diagram illustrating logical components of a computer system 300 suitable for detecting whether a first document is a duplicate of one or more other documents in a document corpus. Prior to discussing these components, it should be appreciated that the components described herein are logical components, not necessarily actual components. In an actual embodiment, any one of the logical components may be embodied in one or more discrete actual components, and/or combined with several components.

The computer system 300 includes a processor 302 for executing instructions to determine whether a first document is substantially similar to another document in a document corpus. The processor executes instructions from a memory 304 that may be comprised of random access memory (RAM), read-only memory (ROM), disk storage, remote online storage, and the like. The computer system is illustrated as also including a duplicate detection component 306 which is used by the computer system 300 to detect whether a first document is substantially similar to another document in a document corpus. Of course, in an actual embodiment, the duplicate detection component 306 may be implemented as a hardware component, a software component (stored in the memory 304), a combination of hardware and software, a service provided by another computing device, and the like.

The computer system 300 is also illustrated as including a document corpus 310. As indicated above, the document corpus is a collection of documents, such as documents describing a product or service for sale. This document corpus may be organized in a database, such as illustrated in FIG. 3, but it is not necessary to be in a database. It may be, however, important to be able to access the documents in the document corpus when identifying and filtering for duplicates, as will be described in more detail below. While the document corpus 310 is illustrated as being a part of the computer system 300, in an actual embodiment, the document corpus 310 may be stored external, yet accessible, to the computer system 300.

The computer system 300 is also illustrated as including a token index 312. As will be described below, the token index corresponds to an index of tokens (including alphabetic strings, numbers, and alpha-numeric strings) from the various documents in the document corpus 310. As is common with indices, the token index 312 will typically include information such as, but not limited to, the frequency of a token in each document, references to the documents for each token, the document field in which the token is found, and the like. As with the document corpus 310, while illustrated as a logical component of the computer system 300, in an actual embodiment the token index 312 may be incorporated in the computer system which is otherwise accessible to the computer system for use in determining whether a document is substantially similar to one or more documents in a document corpus 310, and therefore considered to be a duplicate document. Further still, the index, while suggestively illustrated as being stored in a database, may be formed and maintained in an manner according to the needs of the implementing system.

Figure 4:
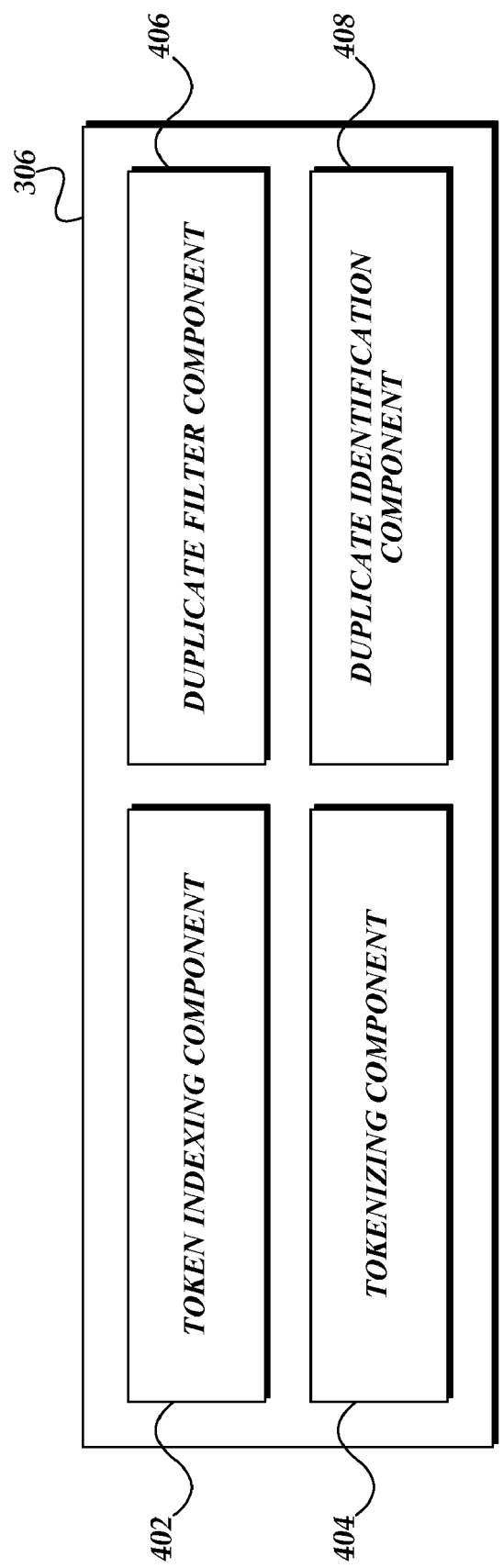
FIG. 4 is a block diagram illustrating logical components of duplicate detection component, as introduced in regard to the host server of FIG. 3, for detecting duplicate document descriptions submitted to the host server, in accordance with one or more embodiments of the disclosed subject matter.

Turning again to the duplicate detection component 306, it should be appreciated that this component may be broken down into its own logical components. To that end, FIG. 4 is a block diagram illustrating logical components of a duplicate detection component 306 formed according to the disclosed subject matter. As shown in FIG. 4, the duplicate detection component 306 includes a token indexing component 402, a tokenizing component 404, a duplicate filter component 406, and a duplicate identification component 408. Of course, it should be appreciated that while a duplicate detection component 306 would include these logical components, in an actual embodiment, there may be additional components not described herein. Further still, each of the above-described components may be combined in one or more of the logical components. Accordingly, the logical divisions shown in FIG. 4 should be viewed as illustrative only, and not viewed as limiting upon the disclosed subject matter.

The token indexing component 402 is used to generate the token index 312 described above, using tokens generated by the tokenizing component 404. The tokenizing component 404 parses a document to identify discrete alphabetic, alpha-numeric, and numeric stings, and converts the identified strings into a set of tokens. The duplicate filter component 406 filters candidate duplicate documents identified by the duplicate identification component 408 to eliminate those candidates that are not true duplicates of (i.e., are not substantially similar to) a first document. Finally, as suggested, the duplicate identification component 408 identifies potential duplicates, referred to as candidate duplicate documents or, more simply, candidate documents, of a given document in the document corpus 310.

To better illustrate the operation of the various components described in both FIGS. 3 and 4, reference is made to various flow diagrams. As suggested above, the duplicate detection component 306 determines whether a given document, such as a product description offered by a vendor/consumer, is a duplicate of another document in a document corpus 310. This determination is made, at least in part, by use of the token index 312. Accordingly, FIG. 5 is a flow diagram of an illustrative routine 500 for generating a token index 312 from the documents of a document corpus 310, in accordance with one or more embodiments of the disclosed subject matter.

Figure 5:
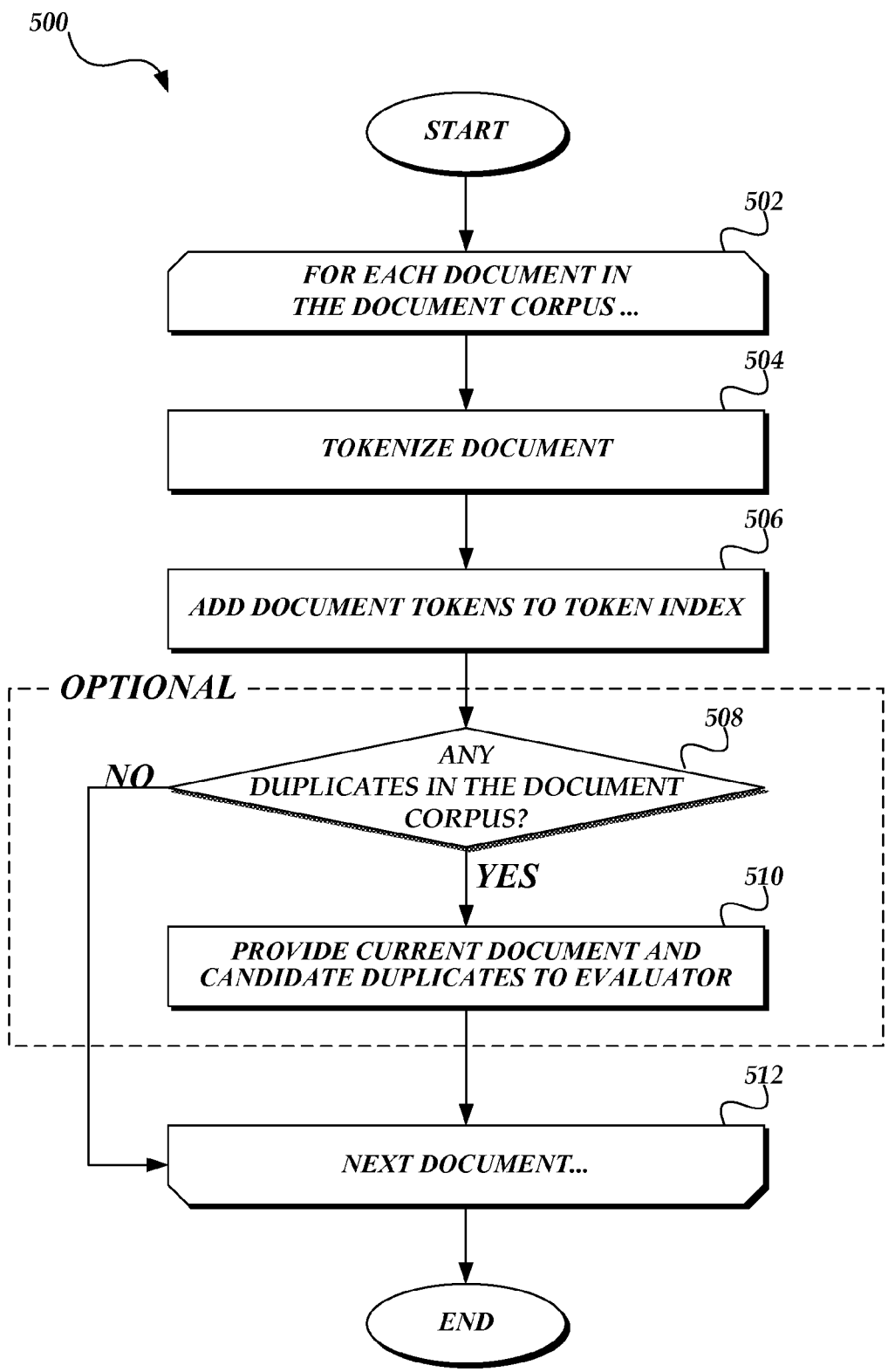
FIG. 5 is a flow diagram of an illustrative routine for preparing an index of a document corpus for use in duplicate detection according to aspects and embodiments of the disclosed subject matter.

As shown in FIG. 5, control block 502 is the beginning of an iterative process that loops through each of the documents (i.e., "for each document") in the document corpus 310 in order to generate the token index 312. This iterative process includes all of the steps 504-510 between the start of the loop 502 and end control block 512. Thus, for a given document in the document corpus 310, at block 504, the document is tokenized. As indicated already, tokenizing a document comprises generating a set of tokens, each corresponding to a string of characters in the document, including alphabetic strings, alpha-numeric strings, and numeric strings. Only one token is generated for a unique set or string of characters such that if the same string occurs more than once in the document, only one token for that string will be generated (though the number of occurrences of that string in the document may be noted.) After generating a set of tokens for the document, at block 506, the set of tokens for the document are added to the token index 312.

At this point, if the assumption can be made that there are no duplicates already in the document corpus 310, the process can skip the next two steps which are directed to detecting duplicates in those documents already indexed. Hence, the steps at decision block 508 and block 510 are identified as being optional. Alternatively, however, assuming that it would be good to verify that there are not already duplicates in the document corpus, the routine 500 proceeds to decision block 508 where a determination is made as to whether there are any duplicates of the current document in the document corpus. Determining whether there are one or more duplicates of the document in the document corpus 310 is described in greater detail below in regard to FIGS. 7A and 7B. If the there are one or more duplicates of the current document in the document corpus 310, at block 510 the set of candidate documents and the current document may be provided to an evaluator for final determination as to whether they are, in fact, duplicates. Moreover, should the evaluator determine that at least some of the documents are duplicates, the evaluator may associate the documents in the document corpus 310 as referencing or describing the same product. Thereafter, or if there are no candidate documents for the current document, the process 500 moves to end control block 512 that causes a return to control block 502 where the process iterates to the next document in the document corpus 310. This repetition continues until the process 500 has iterated through all of the documents in the document corpus 310, and then terminates.

Figure 6:
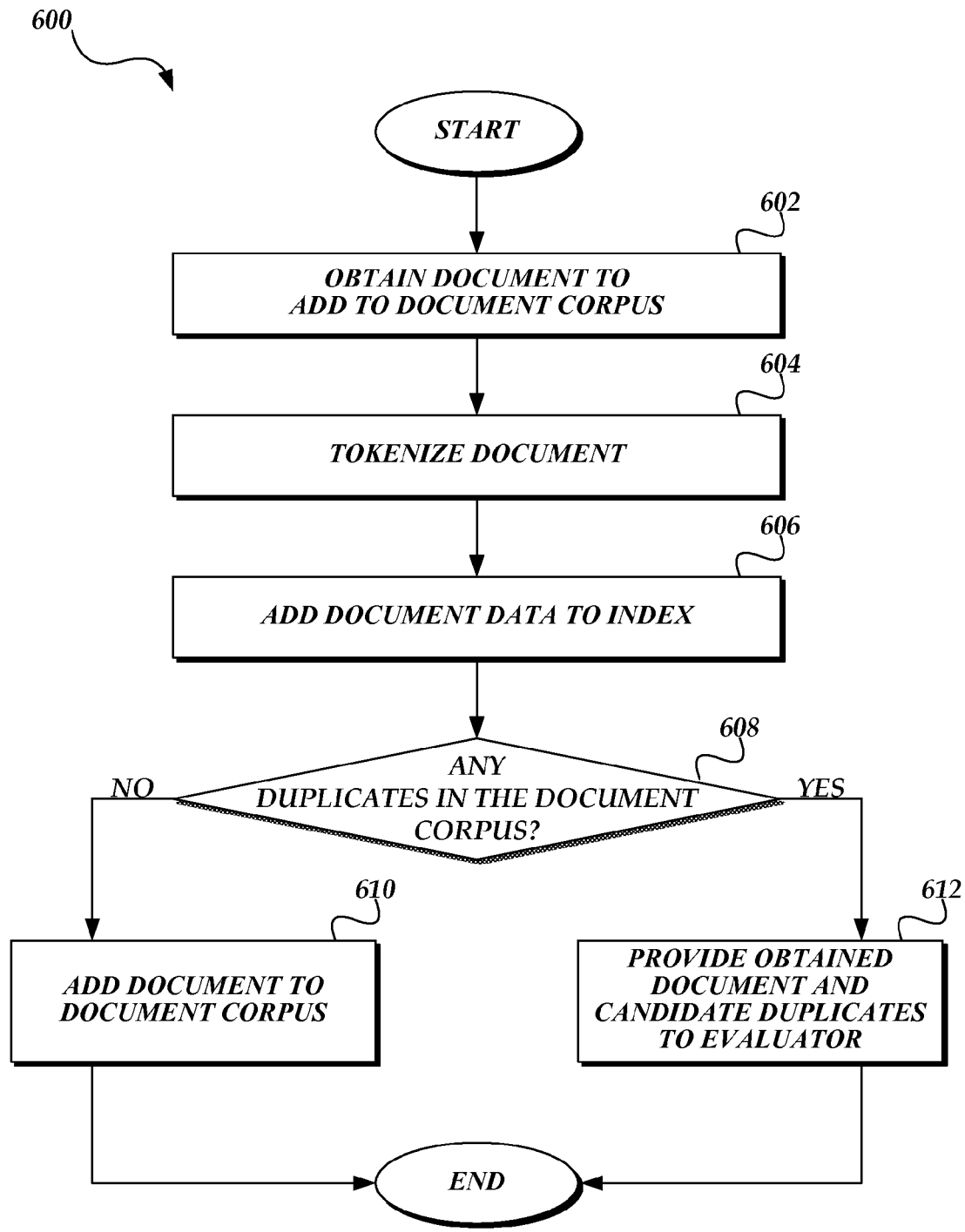
FIG. 6 is a flow diagram of an illustrative routine for determining whether a submitted document is substantially similar to one or more other documents in a document corpus and, therefore, considered a duplicate, in accordance with one or more embodiments of the disclosed subject matter.

In contrast to indexing the documents in the document corpus 310 as described in regard to FIG. 5, FIG. 6 is a flow diagram of an illustrative routine 600 for detecting and identifying candidate documents when receiving and adding a new document to the document corpus 310, in accordance with one or more embodiments of the disclosed subject matter. Beginning at block 602, a document for addition to the document corpus 310 is obtained. At block 604, the obtained document is tokenized, yielding a set of tokens for the obtained document as discussed above. At block 606, the obtained document is added to the token index 312.

Figure 7A:
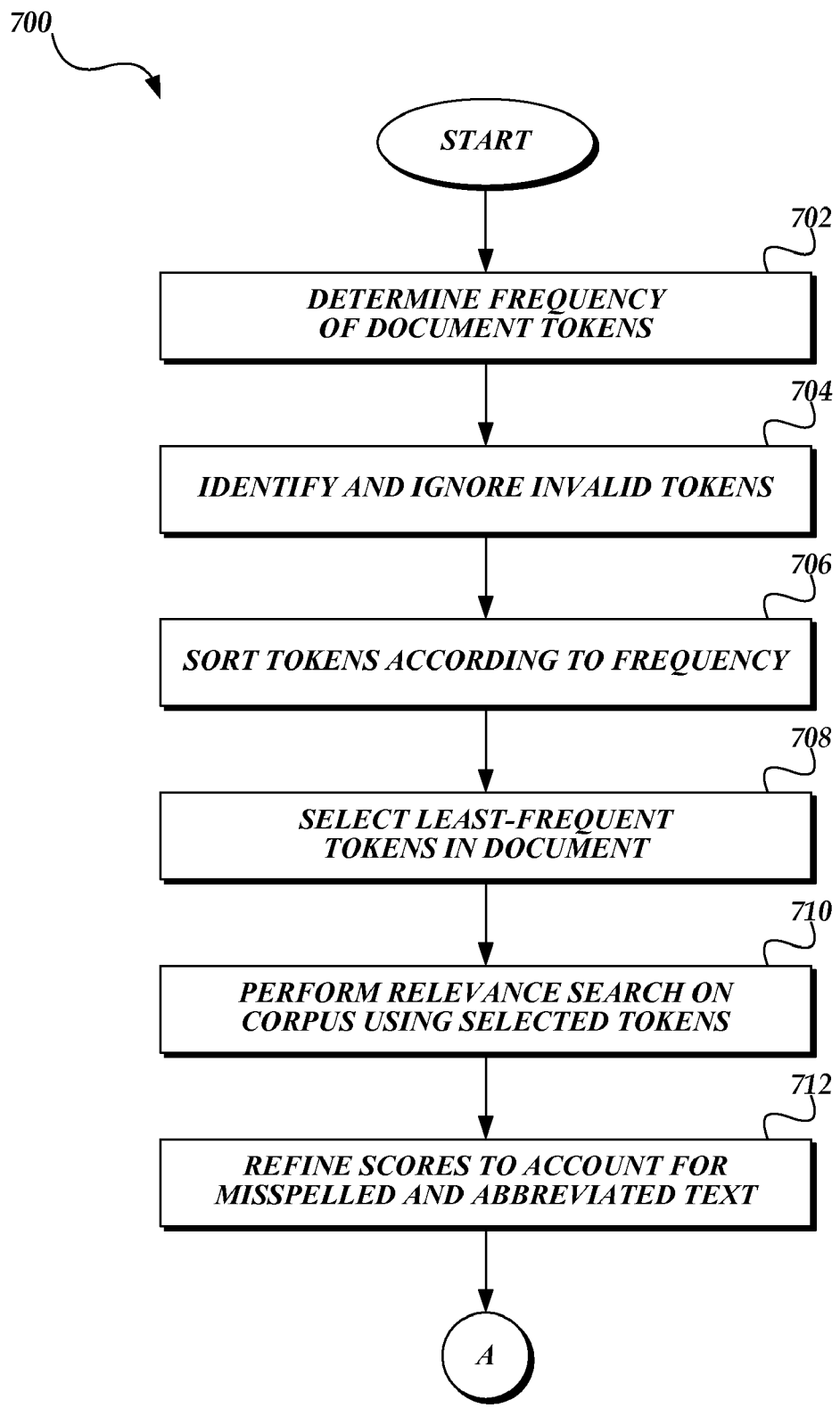
FIGS. 7A-7B are a flow diagram of an illustrative routine for identifying candidate duplicate documents for a submitted document and filtering out false duplicates from the candidate documents, in accordance with one or more embodiments of the disclosed subject matter.

At decision block 608, a determination is made as to whether or not the obtained document is substantially similar to, and therefore considered a duplicate of, one or more other documents in the document corpus 310, as described below in regard to FIGS. 7A and 7B. If it is determined that the obtained document is not substantially similar to (and therefore not a duplicate of) other documents in the document corpus 310, at block 610 the document is simply added as a new item to the document corpus. Alternatively, if it is determined that the document may be a duplicate of one or more other documents already in the document corpus 310, at block 612 the obtained document and the set of candidate documents identified as potential duplicates are provided to an evaluator. As above, should the evaluator determine that at least some of the candidate duplicate documents are, in fact, substantially similar and therefore considered duplicates of the obtained document, the evaluator may associate the those duplicates in the document corpus 310. After providing the obtained document to the evaluator, the routine 600 terminates.

As mentioned above, FIGS. 7A and 7B are of a flow diagram of an illustrative routine 700 for determining a set of candidate documents (if any) for a current document from the documents in the document corpus 310, in accordance with one or more embodiments of the disclosed subject matter. Beginning at block 702, from the token information generated for the current document, the frequency of the tokens in the current document (i.e., the number of occurrences of the string represented by each token in the current document) is determined. At block 704, invalid tokens (such as misspellings, inadvertent entries, and the like) are identified and eliminated from evaluation. Eliminating invalid tokens ensures a greater likelihood of properly identifying candidate duplicate documents. What remains are valid tokens with their associated occurrence frequency.

At block 706, the tokens are sorted according to their frequency in the current document. At block 708, one or more of the least frequent tokens from the current document are selected. The actual number of tokens selected may be based on a threshold percentage of the total number of tokens in the document, on an absolute threshold number, or according to a particular threshold frequency. Other heuristics for selecting the tokens may further be used, all of which are contemplated as falling within the scope of the disclosed subject matter. Further still, the various thresholds and/or heuristics for selecting the least frequently occurring tokens from the current document may be user configurable.

At block 710, using the selected tokens, a relevance search is performed on the token index 312. As those skilled in the art will appreciate, a relevance search, as used in this context, matches the selected tokens of the current document to other documents in the document corpus having all or some of the same tokens. Moreover, a relevance search generates a score between the current document and another document (based on the amount of search tokens that are found in common with each of the other documents). Still further, a relevance search generates scores based on exact matches between tokens. As indicated above, some documents may include structural or field information. While comparing tokens of similar fields may provide useful information, it should be appreciated that the relevance search of block 710 is an un-fielded search, i.e., the relevance search is made irrespective of any field relation information.

After the relevance search, recognizing the relevance score is based on exact matches and that many of the tokens may be matches but for being slightly misspelled or abbreviated, at block 712 the scores returned from the relevance search are refined to account for such common entry differences, resulting in improved scores (i.e., the likelihood that a candidate document is a duplicate) that more accurately reflect the relevance between the candidate duplicate documents and the current document.

Figure 7B:
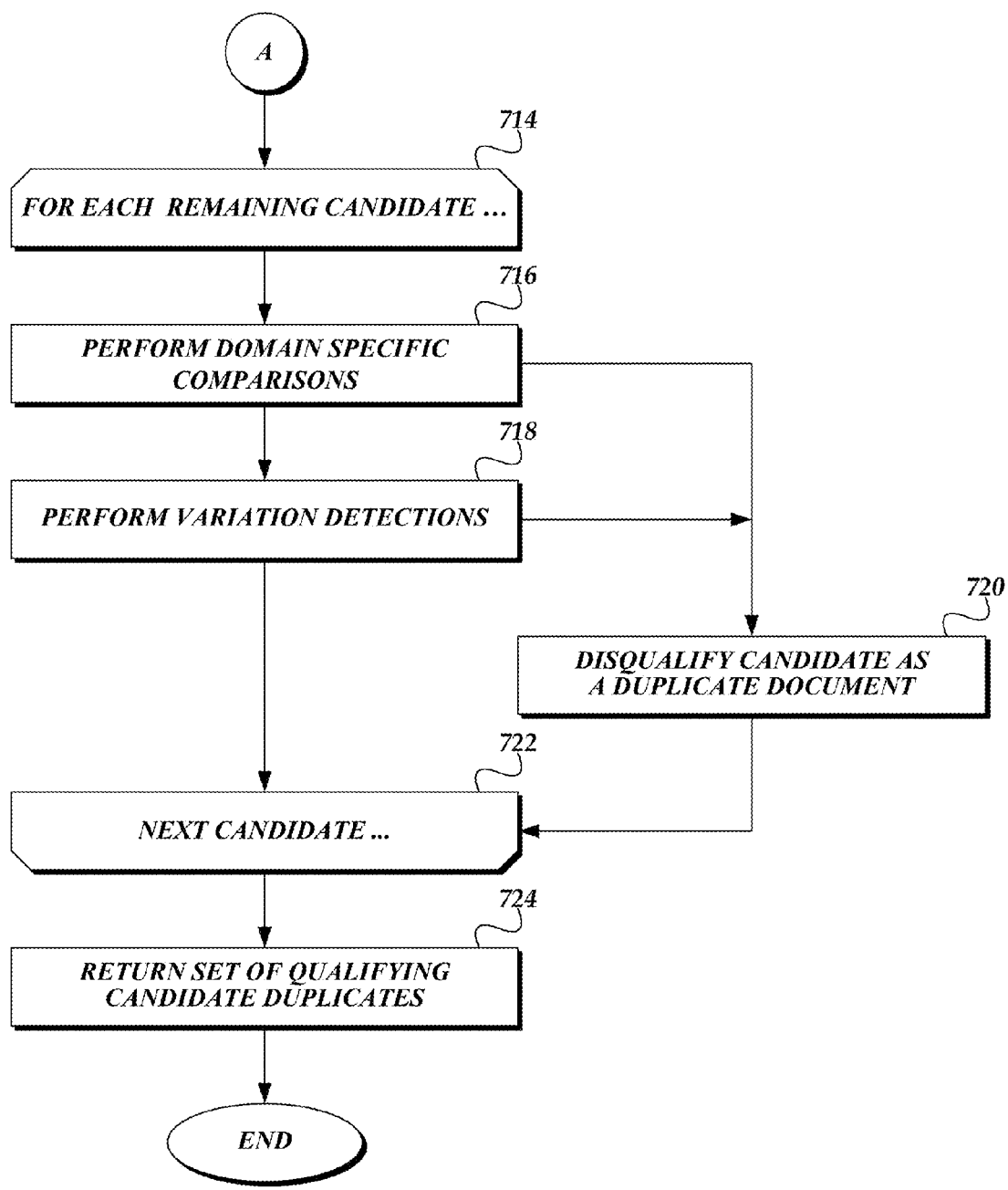

Turning now to FIG. 7B, at control block 714 a looping construct is begun that iterates through the results/candidate documents identified by the previous steps. More particularly, the looping construct iterates through those candidate documents whose score exceeds a predetermined threshold value. Thus, for each identified candidate document with a score above a threshold value, steps 716-720 may be executed. Blocks 716 and 718 identify various filters that may be applied to each candidate document to determine, to a greater degree, whether a candidate document may be a true duplicate of the current document (such that it describes the same or substantially the same subject matter). At end control block 724, the next candidate document with a score above a given threshold is selected and the loop is repeated. When there are no additional candidate documents with a resulting score above the predetermined threshold, the routine 700 proceeds to block 724.

With regard to the filtering steps 716 and 718, in contrast to the relevance search of block 710, at block 716 domain specific (or fielded) comparisons are made between information in the current document and the selected candidate document. Domain specific comparisons are directed to types (or domains/fields) of information in each document when present and identifiable in the documents. These domains include merchant source (i.e., whether the source of the current document is the same as the source for the selected candidate document); package quantities; UPC or product identification values; manufacturer, and the like. As an additional domain specific comparison, a comparison as to the source of both documents (the current document and the candidate document) is made. If the source of the current document and the candidate document is the same, i.e., submitted by the same merchant, an assumption that a merchant would not provide duplicate documents implies that the products described by the two documents are different. Alternatively, if the package quantities, the UPC values, or the manufacturers differ, then the current document and the selected candidate document are not duplicates (i.e., describe different products). If the domain comparisons of block 716 show that the documents are not duplicates, the process 700 proceeds to block 720 where the candidate document is disqualified as a duplicate of the current document.

If the candidate duplicate document is not disqualified as a duplicate document based on domain comparisons, at block 718 variation detections are performed on the candidate document and the current document to determine whether the two documents include mutually exclusive variations such that, while similar, the described subject matter cannot be said to be true duplicates. Examples of such mutually exclusive variations may include the case color (e.g., pink, black, blue, or red) of an otherwise similar portable media player. Accordingly, if the current document and candidate duplicate documents are determined to be such variations, they are not considered duplicates and the routine 700 proceeds to block 720 where the candidate document is disqualified as a duplicate of the current document. If the candidate document has not been disqualified, or after disqualifying the candidate document as a duplicate, the routine 700 proceeds to end control block 722.

At block 724, after processing each candidate document having a score above a given threshold, the set of candidate documents that have not been disqualified as duplicates are returned as the results of the routine 700, and the routine terminates.

It should be appreciated, that while the above described routine 700 (as well as all other routines) illustrate a particular order, those skilled in the art will recognize that various modifications may be made to the order without departing from the scope and intent of the disclosed subject matter.

While the above description has generally been made with regard to determining whether a given document described the same or substantially similar product as described in another document in a document corpus, it should be appreciated that the inventive aspects of the disclosed subject matter may be suitably and beneficially applied to determining duplicate documents generally (based on the subject matter of the content). It should be further appreciated that the various methods described above may be located on a computer-readable medium as executable modules and/or instructions, including media such as DVD-ROMs, CD-ROMS, hard disk drives, flash drives, and the like, for execution on any number of computing devices.

As indicated above, one aspect of determining whether documents are substantially the same (and therefore considered as duplicates) is in determining the similarity of the document strings/tokens. A common algorithm for determining a similarity value between two documents is known as the Jaccard algorithm. The Jaccard algorithm, which yields a similarity score, is expressed as:

$$Jaccard(D_1, D_2) = \frac{|S_1 \cap S_2|}{|S_1 \cup S_2|}$$

where $D_1$ corresponds to a first document, such as a product description document provided by a vendor, $D_2$ corresponds to a second document, such as a document within the document corpus 310, $S_1$ corresponds to the set of tokens found in document $D_1$, and $S_2$ corresponds to the set of tokens found in document $D_2$. Unfortunately, Jaccard only works with tokens that match exactly. Moreover, Jaccard fails to recognize that some strings/tokens are more relevant than others in determining whether two documents are substantially similar. However, the disclosed subject matter expands the Jaccard algorithm in novel ways such that strings/tokens that do not match exactly can still be viewed as matching.

In order to match strings that are not exact matches (recognizing that these strings may be misspellings or abbreviations), an edit distance function is used. The edit distance function relies upon knowing some information regarding the strings/tokens that are being compared. More particularly, the edit distance function compares and scores relative similarity between tokens based, in part, on the type of token. When a document is tokenized, as mentioned above, each token is categorized into one of three types: an alphabetic token in which all characters are alphabetic characters; a numeric token where the characters collectively identify a numeric value; and alpha-numeric tokens comprising mixed alphabetic and numeric characters (as well as other characters). Knowing these token types, when comparing and scoring the similarity between two tokens, the following rules may be applied: tokens of different types, when compared, have a similarity score of zero; alpha-numeric tokens are compared for exact matches (after converting the alphabetic characters to lower case characters); numeric tokens are compared numerically for exact matches (after having been converted to their numeric value); and alphabetic characters are compared and scored using an edit distance algorithm. Fractions are handled as separate numbers.

The edit distance function follows the general formula:

$$editDistance = \frac{Length_1 - |UnmatchedSubstrings|}{Length_1}$$

where $Length_1$ corresponds to the character length of the longer of the two tokens being compared, and |UnmatchedSubstrings| corresponds to the character length of the unmatched substrings between the two tokens. For example, given two tokens corresponding to the strings "blk" and "black", the second string "black" would be selected as the token from which $Length_1$ is determined, which in this case is 5. The evaluation of |UnmatchedSubstrings| yields a result of 2, i.e., the character length the unmatched substring "ac". Accordingly, the distance score between the two strings/tokens would be 0.60.

In addition to the edit distance formula above, several heuristics are applied that assist in determining matches. These heuristics include the following: if the first letter of each token does not match, the score is zero; if one of the tokens has less than three characters in length, the score is zero unless the two tokens are an exact match; if one of the tokens has three characters, the score must be greater than or equal to 0.67 or it is set to zero (i.e., at least two characters must match.)

In order to find the best matches between two sets of tokens (per the edit distance formula), in one embodiment, an N×M matrix is constructed, where N represents the number of unique tokens in a first document $D_1$ and M represents the number of unique tokens in a second document $D_2$. Of course, those skilled in the art will appreciated that any suitable construct or data organization may be utilized to organize the scores for additional evaluation as described below. Accordingly, a matrix should be viewed as just one way in which the scores can be organized to identifying matching tokens.

The following table illustrates an exemplary matrix between two sets of tokens with their corresponding scores as determined by the edit distance formula above in view the additional heuristics.

| Distance Scores | Blk | Blue | Slvr | Mand | Blackened |
|---|---|---|---|---|---|
| Black | .6 | .4 | 0 | 0 | .56 |
| Silver | 0 | 0 | .67 | 0 | 0 |
| Mandarin | 0 | 0 | 0 | .5 | 0 |
| Brown | .1 | .1 | 0 | 0 | .4 |

After having generated the matrix of scores, the scores are evaluated to determine the matching pairs. In one embodiment, a greedy algorithm is used to identify matching pairs. According to this greedy algorithm, the highest scoring pair, where the score is greater than or equal to a given threshold, is placed in a set of matching tokens. With reference to the table above and assuming that the threshold score is 0.50, the tokens "Silver" and "Slvr" have the highest score, 0.67, and are therefore considered a match and added to the set of matching tokens, along with their score. Additionally, when added to the set of matching tokens, those tokens are then removed from consideration as matches to other tokens. Thus, once considered a match and added to the set of matching tokens, both "Silver" and "Slvr" are removed from consideration in the matrix. The resulting matrix would then appear as the following.

| Distance Scores | Blk | Blue | Mand | Blackened |
|---|---|---|---|---|
| Black | .6 | .4 | 0 | .56 |
| Mandarin | 0 | 0 | .5 | 0 |
| Brown | .1 | .1 | 0 | .4 |

The process of identifying the highest scoring pair of tokens with a score greater than or equal to a threshold value, adding the pair to the set of matching tokens, and removing the pair of tokens from further consideration, is continued until there are no more available token pairs or there are no more scores above or equal to the threshold score. In this example, the tokens "Black" and "Blk" would match next, followed by the tokens "Mandarin" and "Mand." Of note is that, in this example, the token "Blackened" will not be matched to any token even though it has a score that would qualify as a match. However, the token "Black" is matched to "Blk" because of a higher edit distance score and removed from being matched to any other string/token.

One of the advantages of the greedy algorithm mentioned above is that it can be easily and directly applied to the matrix quickly and efficiently, without undue and extensive evaluation. However, the greedy algorithm may not always yield an overall optimal set of matched tokens (score-wise). Accordingly, in an alternative embodiment, the scores of the various pairs in the matrix are evaluated such that a set of matched tokens is selected to yield an optimal set of matching scores (i.e., the summation of all scores is the highest possible of all permutations.) Other evaluations and selections of matching pairs may also be suitably applied according to specific needs.

Once the set of matching tokens, as determined by the edit distance formula, is completed, an overall score representing the similarity between the two documents, $D_1$ and $D_2$, is determined according to the following algorithm:

$$similarity(D_1, D_2) = \frac{\sum_{(T_1,T_2) \in C, T_1 \in D_1, T_2 \in D_2} editDistance(T_1, T_2)}{|C| + |S_1 - C| + |S_2 - C|}$$

where $T_1$ corresponds to a token of the set $S_1$ from document $D_1$, $T_2$ corresponds to a token of the set $S_2$ from the document $D_2$, editDistance($T_1,T_2$) corresponds to the score of a matched pair ($T_1,T_2$), C corresponds to the set of matched pairs ($T_1,T_2$), |C| corresponds to the number of matched pairs in set C, $|S_1-C|$ corresponds to the number of tokens in set $S_1$ that were not paired/matched with a token from set $S_2$, and $|S_2-C|$ corresponds to the number of tokens in set $S_2$ that were not paired/matched with a token from set $S_1$. Scoring the above example would yield a score of 0.295 according to the following:

$$similarity(D_1, D_2) = \frac{.6 + .67 + .5}{(3) + (1) + (2)}.$$

Figure 8A:
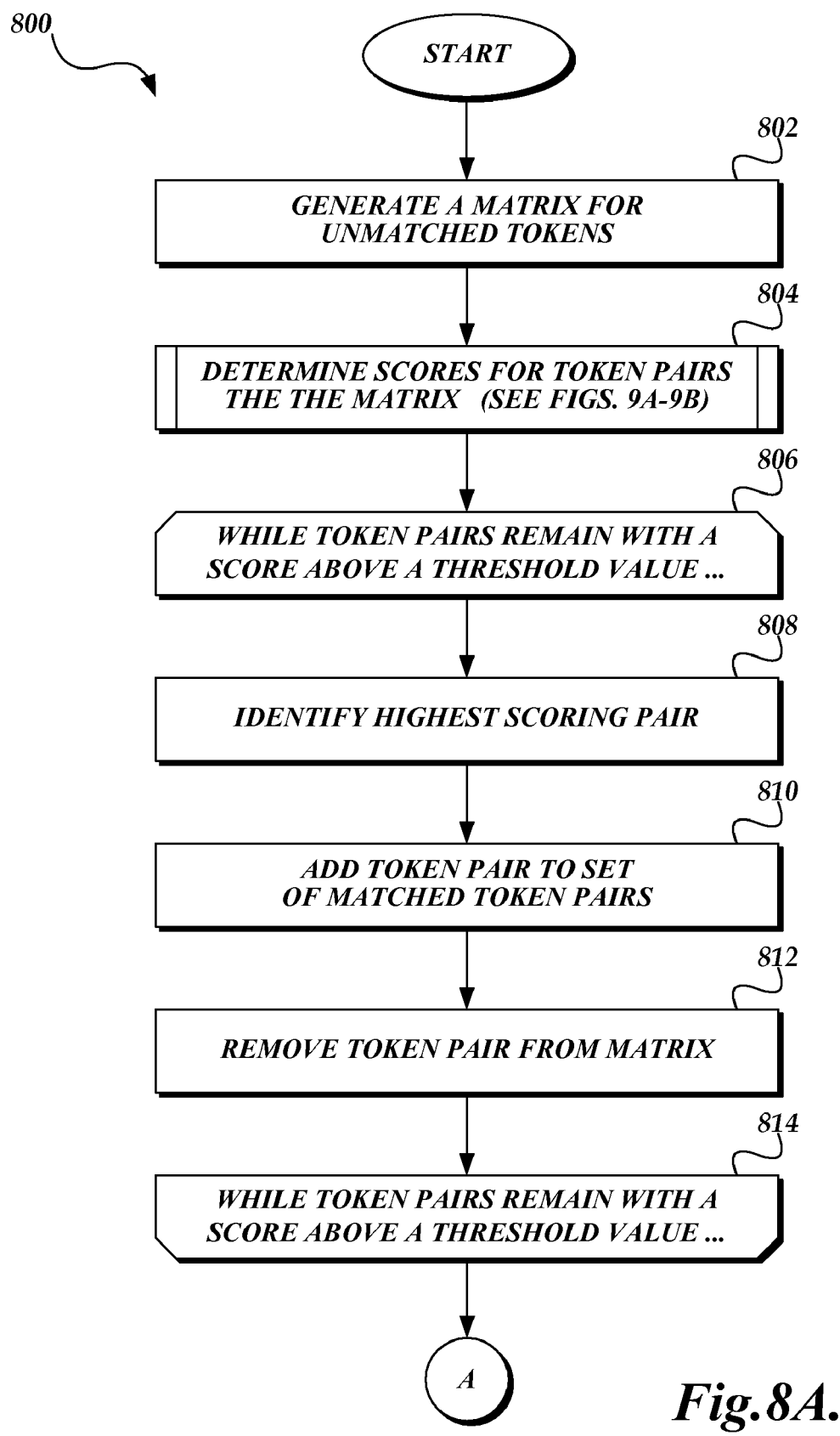
FIGS. 8A and 8B are flow diagram illustrating a routine for determining a similarity score of two documents in accordance with one or more embodiments of the disclosed subject matter.
Figure 8B:
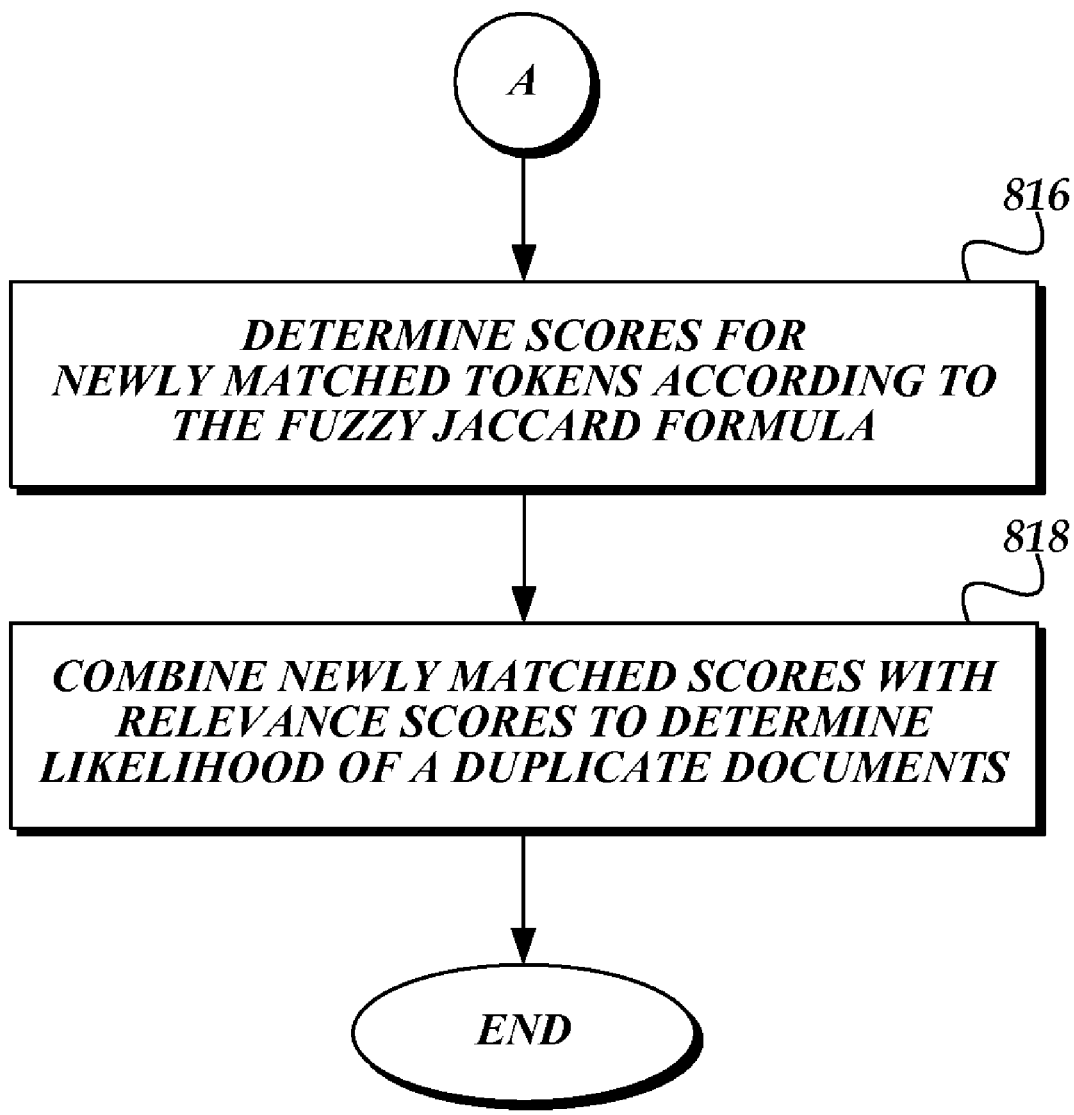

Turning now to FIGS. 8A and 8B, these figures illustrate a routine 800 for determining a similarity score of two documents based on a modified or fuzzy Jaccard algorithm as described above. With regard to the fuzzy Jaccard algorithm above, it should be appreciated that while the discussion has been directed to detecting similarity between tokens/strings that are not exactly the same, the algorithm may also be applied to tokens/strings that match exactly.

To be useful by the routines described above, such as routine 700 in refining the results of the relevance search, the routine 800 presumes that the documents to be compared have already been tokenized. Moreover, while not necessary to the functioning of the routine 800, the following description will be made with regard to matching tokens that are not exact duplicates (spelling-wise) of each other.

At block 802, a matrix is generated for the unmatched tokens of each document. As suggested above a table, linked list, directed acyclical graphs, or any suitable data organization or structure may be used in place of a matrix. Accordingly, the reference to a matrix should be viewed as illustrative, and not limiting upon the disclosed subject matter.

At block 804, scores are determined for each pair of tokens. Determining scores for the pairs of tokens in the matrix is described in greater detail in regard to FIG. 9.

Figure 9A:
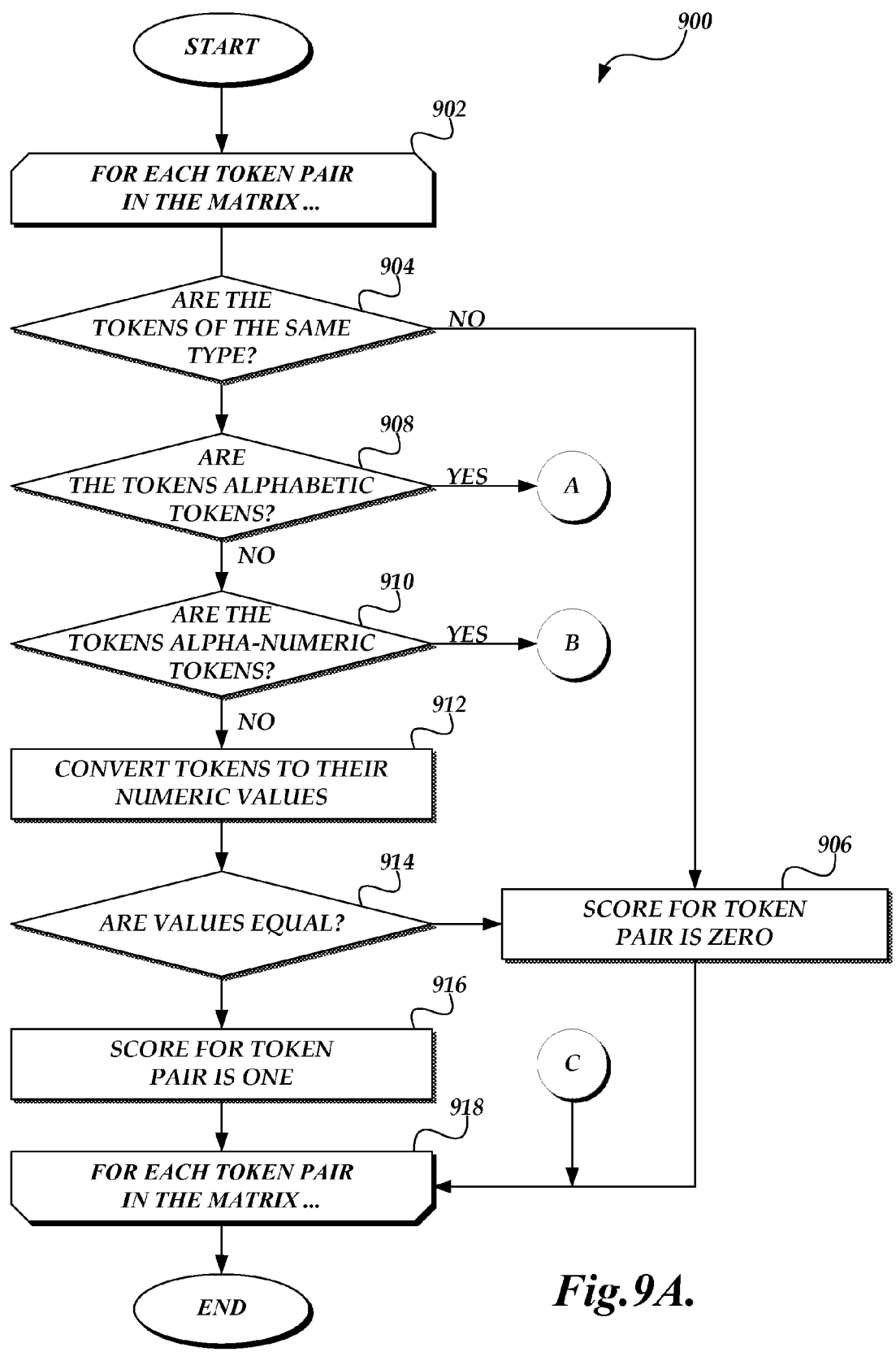
FIGS. 9A and 9B illustrate a flow diagram of a routine for determining similarity scores of each of the pairs of tokens in a matrix in accordance with one or more embodiments of the disclosed subject matter.
Figure 9B:
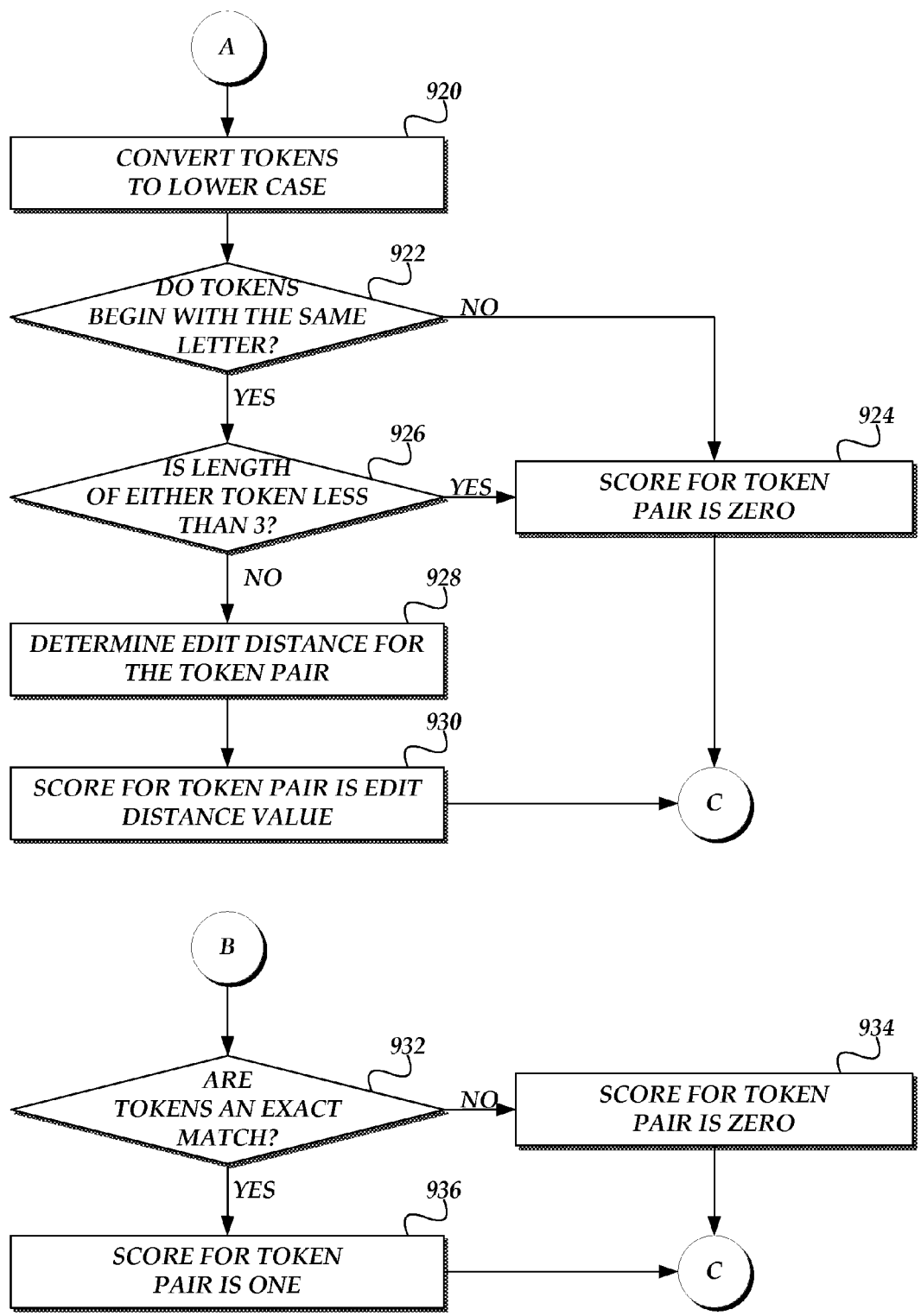

FIGS. 9A-9B illustrate a flow diagram of a routine 900 for determining scores of each of the pairs of tokens in a matrix. Beginning at control block 902, a looping construct is begun to iterate through each pair of tokens in the matrix to determine/generate a edit distance score. Those skilled in the art will appreciate that there are numerous ways to iterate through a matrix or table, or any other structure or data organization implement to identify the various pairs of unmatched tokens, all of which are contemplated as falling within the scope of the disclosure. The looping construct performs those steps between control block 902 and end control block 918 (including those steps shown on FIG. 9B) for each pair of tokens in the matrix in order to generate a score for the token pairs.

With regard to the steps for determining scores for pairs of tokens, at decision block 904 a determination is made as to whether the tokens are of the same type. If the tokens are not of the same type, the routine 900 proceeds to block 906 where the score for the pair of tokens is set at zero. As already discussed, tokens of different types are automatically assigned a similarity score of zero. After setting the score to zero, the routine proceeds to end control block 918 where the routine loops back to control block 904 if there are additional token pairs to score.

If the tokens are of the same type, at decision block 908 a determination is made as to whether the tokens are alphabetic tokens. If the tokens are alphabetic tokens, the routine 900 proceeds to block 920 (FIG. 9B). At block 920, both tokens are converted to lower case (for comparison purposes). Of course, conversion to lower case may be viewed as an optional step since comparing/matching characters of lower and upper case is well known in the art. At decision block 922, a determination is made as to whether the tokens begin with the same character. If not, the routine 900 proceeds to block 924 where the score for the token pair is set to zero. Thereafter, the routine proceeds to block 918 (FIG. 9A) for iteration to additional token pairs, as described above.

If the first characters of the tokens are the same, the routine 900 proceeds to decision block 926. At decision block 926, a determination is made as to whether one of the tokens is less than three characters. By forcing tokens to be at least three characters, common pairs such as "she" and "he" are not included as matches. If either of the tokens is less than three characters in length, the routine 900 proceeds to block 924 where the score for the token pair is set to zero. It should be appreciated that this works only if the tokens are already known to not match exactly. If this is not known, if one of the tokens is less than three characters (or some other threshold value), the routine may proceed to decision block 932 where an exact match of tokens make take place.

If the characters are at least three characters in length, the routine 900 proceeds to block 928. At block 928, the edit distance between the two tokens, as described above, is determined. Thereafter, at block 930, the edit distance is stored as the score for the token pair. Thereafter, the routine 900 proceeds to end control block 918 (FIG. 9A) as discussed above.

Turning again to FIG. 9A, if the tokens are not alphabetic tokens as determined in decision block 908, the routine 900 proceeds to decision block 910. At decision block 910, a determination is made as to whether the tokens are alpha-numeric tokens. If the tokens are alpha-numeric tokens, the routine 900 proceeds to decision block 932 (FIG. 9B). At decision block 932, a determination is made as to whether the tokens are an exact match. Optionally (not shown) prior to determining whether the tokens are an exact match, the alphabetic characters may be converted to lower case characters. If the tokens are not an exact match, at block 934 the score for the token pair is set to zero. Alternatively if the tokens are an exact match, at block 936 the score for the token pair is set to one. In either case, after setting the score for the token pair, the routine 900 proceeds to end control block 918 (FIG. 9A) as described above.

If, at decision block 910, the tokens are not alpha-numeric tokens, the routine 900 proceeds to block 912. In reaching block 912, the tokens must be numeric tokens. Thus, at block 912, the tokens are converted to the corresponding numeric value. At decision block 914, a determination is made as to whether the values (and therefore the tokens) are equivalent. If not, at block 906 the score for the token pair is set to zero. Alternatively, if the values are equivalent, at block 916 the score for the token pair is set to one. Thereafter the routine 900 proceeds to end control block 918, and processing continues as described above.

Once all of the token pairs in the matrix have been assigned a score, the routine 900 terminates.

Returning again to FIG. 8A, at control block 806, an looping construct is begun. This looping construct executes the steps 808-812 (i.e., those steps between control block 806 and end control block 814) while the following conditions are met: (1) that there are pairs of tokens in the matrix (with pairs meaning a token from one document paired with a token from another document), and (2) that at least one score for the tokens remaining in the matrix is above a scoring threshold.

Thus, at block 808, the highest scoring token pair in the matrix is identified. At block 810, the token pair is added to a matched set of token pairs. At block 812, the token pair is then removed from the matrix (as described above). At end control block 814, the routine again revisits the conditions for looping: that there are remaining pairs in the matrix and that at least one score is above a scoring threshold. If these conditions are still true, steps 808-812 are repeated. Moreover, this repeating continues at least one conditions is no longer true.

At block 816 (FIG. 8B), a similarity score for the two documents is generated according to the fuzzy Jaccard algorithm identified above. At block 818, the similarity score for the documents is used to refine the relevance scores (as discussed in block 712 of FIG. 7 above.) Thereafter, the routine 900 terminates.

As indicated above, some tokens, when matched, are stronger indicators that the documents describe substantially similar subject matter than others. More particularly, the inverse document frequency, or IDF, of matched tokens in a document corpus can provide a strong indication as to whether or not two documents are duplicates (i.e., describe substantially similar subject matter.) However, while computing the IDF for tokens that match exactly is straightforward and known in the art, commonly know formulas break down when non-identical tokens/strings are matched, such as via the fuzzy Jaccard algorithm described above. At least part of the reason behind this difficulty arises from misspelled words. For example, consider the token, "fuchsia," from a first document and its misspelled counterpart, "fuxsia," from a second document. The similarity score for the tokens would be 0.71, and would likely be considered a matching token pair. Assuming that the misspelling of the color as "fuxsia" is rare, the inverse document frequency of this token would be extremely high and, as such, give greater weight to this token than is justified relative to other tokens in the same document. As a solution to this disproportionate weighting, and according to aspects of the disclosed subject matter, the IDFs of the matching tokens are combined using the harmonic mean of the tokens. More particularly, according to one embodiment, the term or token frequency value TF (the number of times the token appears in its document) for the two tokens in a newly matched token pair are averaged to get an arithmetic mean, i.e., a combined TF value. Additionally, a harmonic mean of the IDF values for the matched tokens is determined, generating a combined IDF for the matched tokens. Using the combined TF and combined IDF, a TFIDF value for the matched token pair of tokens, u and v, is determined. The formula for determining the combined TFIDF for a matched pair of tokens (u,v) can be expressed as follows:

$$TFIDF(u, v) = \frac{(Tu + Tv)}{2}\left(\frac{1}{\left(\frac{1}{Iu} + \frac{1}{Iv}\right)}\right)$$

where Tu represents the token frequency of token u in document $D_1$, Tv represents the token frequency of token v in document $D_2$, Iu represents the IDF of the token u in the document corpus, and Iv represents the IDF of the token v in the document corpus.

The results of the above formula for determining the TFIDF of the matched tokens, u and v, may then be applied to the fuzzy Jaccard formula discussed above. More particularly, an Importance Weighted Fuzzy Jaccard algorithm (IWFJ) for providing a similarity score of two documents, G1 and G2, may be expressed as follows:

$$IWFJ(D_1, D_2) = \frac{WeightedCommonSimilarityScore}{(MatchedTokensTFIDF + UnmatchedTokensTFIDF)}$$

according to the following sub-formulas:

$$WeightedCommonSimilarityScore = \sum_{(u,v) \in C, u \in S_1, v \in S_2} TFIDF(u, v) \cdot editDistance(u, v);$$

$$MatchedTokensTFIDF = \sum_{(u,v) \in C, u \in S_1, v \in S_2} TFIDF(u, v); \text{ and}$$

$$UnmatchedTokensTFIDF = \sum_{w \in (S_1 - C)} TFIDF(w) + \sum_{x \in (S_2 - C)} TFIDF(x);$$

where $D_1$ and $D_2$ correspond to two documents to be compared for the likelihood of similarity, u represents a token from document $D_1$, v represents a token from document $D_2$, (u,v) represent a matched pair of tokens, C represents the set of matched token pairs, $S_1$ represents the set of tokens from document $D_1$, $S_2$ represents the set of tokens from document $D_2$, w represents an unmatched token from the set $S_1$ of tokens from document $D_1$ (i.e., "$S_1$-C"), and x represents an unmatched token from the set $S_2$ of tokens from the document $D_2$ (i.e., "$S_2$-C").

It should be appreciated that the IWFJ similarity score for two documents, $D_1$ and $D_2$, is a symmetrical function, i.e., the comparison of document $D_1$ to document $D_2$ is the same as the comparison of document $D_2$ to document $D_1$. However, it is also sometimes useful to determine whether or how much of document $D_1$ is contained within document $D_2$, which is not symmetrical. Nevertheless, a similarity score IWFJ can be further modified to yield an Importance Weighted Fuzzy Containment (IWFC) algorithm as follows:

$$IWFC(D_1, D_2) = \frac{\sum_{(u,v) \in C, u \in S_1, v \in S_2} TFIDF(u, v) \cdot editDistance(u, v)}{\sum_{(u,v) \in C, u \in S_1, v \in S_2} TFIDF(u, v) + \sum_{w \in (S_1 - C)} TFIDF(w)}.$$

With these additional algorithms for generating similarity scores for two documents, reference is made again to FIG. 8B. In particular, while step 816 illustrates determining a score for two documents from, inter alia, the matched tokens between the two documents using a Fuzzy Jaccard algorithm, as alternative to the fuzzy Jaccard algorithm (not shown) the Importance Weighted Fuzzy Jaccard (IWFJ) or the Importance Weighted Fuzzy Containment (IWFC) algorithms may be used.

While various embodiments have been illustrated and described, it will be appreciated that various changes can be made therein without departing from the spirit and scope of the invention.

The embodiments of the invention in which an exclusive property or privilege is claimed are defined as follows:

1. A method for determining the likelihood of two documents describing similar subject matter, the method comprising:
    obtaining a set of tokens for each of a first and a second document, wherein each token in the set of tokens represents a series of characters found in its corresponding document;
    obtaining a set of matched token pairs, each matched token pair comprising a first token from the set of tokens corresponding to the first document and a second token matching the first token, the second token from the set of tokens corresponding to the second document, each matched token pair having a token similarity score;
    determining a similarity score for the first and second documents according to the token similarity scores of the token pairs in the set of matched token pairs by dividing the sum of the similarity scores of the token pairs in the set of matched token pairs by the sum of the number of token pairs in the set of matched token pairs, the number of tokens from the first document less the number of token pairs in the set of matched token pairs, and the number of tokens from the second document less the number of token pairs in the set of matched token pairs; and
    providing the determined similarity score as the likelihood of the first and second documents describing similar subject matter.

2. The method of claim 1, wherein each token is associated with a type.

3. The method of claim 2, wherein each token type is one of an alphabetic type, an alpha-numeric type, or a numeric type.

4. The method of claim 3, wherein the token similarity score for each matched token pair is zero for a matched token pair if a first token and a second token of the matched token pair are of different types.

5. The method of claim 4, wherein the token similarity score for each matched token pair having numeric type tokens is determined by converting the tokens of the token pair to their numeric values, setting the similarity score to zero for the matched token pair when the numeric values are not equivalent, and setting the similarity score for the matched token pair to one when the numeric values are equivalent.

6. The method of claim 4, wherein the token similarity score for each matched token pair having alpha-numeric type tokens is determined by setting the similarity score to zero for the matched token pair when the tokens are not exact duplicates, and setting the similarity score for the matched token pair to one when the tokens are duplicates.

7. The method of claim 4, wherein the token similarity score for each matched token pair is determined by determining whether the length of a token of the matched token pair is less than a threshold length and, if so, setting the similarity score for the matched token pair to zero if the tokens are not an exact match.

8. The method of claim 4, wherein the token similarity score for each matched token pair having alphabetic tokens is set to a value of an edit distance between the two tokens, wherein the value of the edit distance is calculated by subtracting the length of the unmatched substrings between the two tokens from the length of the longer token, and dividing the result by the length of the longer token.

9. A computer system for determining a likelihood of a first and second document describing similar subject matter, the computer system comprising:
    a processor; and
    a memory;
    wherein the computer system is configured to:

obtain a set of tokens for each of the first and second documents, wherein each set of tokens represents a series of characters found in its corresponding document;

provide a matrix of token pairs, each token pair comprising a first token from the set of tokens corresponding to the first document and a second token from the set of tokens corresponding to the second document;

generate a similarity score for each token pair in the matrix by:

assigning each of the first token and the second token to one of a first type, a second type, or a third type based on the content of the tokens;

setting the similarity score for the token pair to a floor value when the type of the first token is different from the type of the second token;

setting the similarity score for the token pair based on a first calculation when the first token and the second token are of the first type;

setting the similarity score for the token pair based on a second calculation different from the first calculation when the first token and the second token are of the second type; and setting the similarity score for the token pair based on a third calculation different from the first and second calculations when the first token and the second token are of the third type;

identify those token pairs in the matrix with a similarity score above a threshold score and add the identified token pairs to a set of matched tokens;

determine a similarity score for the first and second documents according to the scores of the token pairs in the set of matched tokens; and provide the determined similarity score as the likelihood of the first and second documents describing similar subject matter.

10. The computer system of claim 9, wherein the first type is an alphabetic type, the second type is an alpha-numeric type, and the third type is a numeric type.

11. The computer system of claim 10, wherein the third calculation comprises converting the first token and the second token to their numeric values, setting the similarity score to zero for the token pair if the numeric values are not equivalent, and setting the similarity score for the token pair to one if the numeric values are equivalent.

12. The computer system of claim 10, wherein the second calculation comprises setting the similarity score to zero for the token pair if the tokens are not exact duplicates, and setting the similarity score for the token pair to one if the tokens are duplicates.

13. The computer system of claim 10, wherein the first calculation comprises setting the similarity score for the token pair to zero when either the first or the second token is less than a threshold length and the tokens are not an exact match.

14. The computer system of claim 10, wherein the first calculation comprises setting the similarity score for the token pair to a value of an edit distance between the two tokens, wherein the value of the edit distance is calculated by subtracting the length of the unmatched substrings between the two tokens from the length of the longer token, and dividing the result by the length of the longer token.

15. The computer system of claim 9, wherein the floor value is zero.

16. The computer system of claim 9, wherein identifying those token pairs in the matrix with a similarity score above a threshold score and adding the selected token pairs to a set of matched tokens comprises repeatedly:

identifying the token pair in the matrix with the highest similarity score;

adding the identified token pair to the set of matched tokens; and removing the tokens of the identified token pair from the matrix;

until there are no token pairs in the token matrix with a similarity score above a threshold score.

17. The computer system of claim 9, wherein determining a similarity score for the first and second documents according to the scores of the token pairs in the set of matched tokens comprises dividing the sum of the similarity scores for of the token pairs in the set of matched token pairs by the sum of number of token pairs in the set of match tokens, the number of tokens from the first document less the number of token pairs in the set of matched tokens, and the number of tokens from the second document less the number of token pairs in the set of matched tokens.

18. The computer system of claim 9, wherein determining a similarity score for the first and second documents according to the scores of the token pairs in the set of matched tokens comprises determining a similarity score using an Importance Weighted Fuzzy Jaccard formula.

19. The computer system of claim 9, wherein determining a similarity score for the first and second documents according to the scores of the token pairs in the set of matched tokens comprises determining a similarity score using an Importance Weighted Fuzzy Containment formula.

20. A tangible computer-readable medium bearing computer-executable instructions which, when executed on a computing device, cause the computing device to carry out operations for determining the likelihood of two documents describing similar subject matter, the operations comprising:

obtaining a set of tokens for each of a first and a second document, wherein each token in the set of tokens represents a series of characters found in its corresponding document;

obtaining a set of matched token pairs, each matched token pair comprising a first token from the set of tokens corresponding to the first document and a second token matching the first token, the second token from the set of tokens corresponding to the second document, each matched token pair having a token similarity score;

determining a similarity score for the first and second documents according to the token similarity scores of the token pairs in the set of matched token pairs by dividing the sum of the similarity scores of the token pairs in the set of matched token pairs by the sum of the number of token pairs in the set of matched token pairs, the number of tokens from the first document less the number of token pairs in the set of matched token pairs, and the number of tokens from the second document less the number of token pairs in the set of matched token pairs; and providing the determined similarity score as the likelihood of the first and second documents describing similar subject matter.

21. The computer-readable medium of claim 20, wherein each token is associated with a type.

22. The computer-readable medium of claim 21, wherein each token type is one of an alphabetic type, an alpha-numeric type, or a numeric type.

23. The computer-readable medium of claim 22, wherein the token similarity score for each matched token pair is zero for a matched token pair if a first token and a second token of the token pair are of different types.

24. The computer-readable medium of claim 23, wherein the token similarity score for each matched token pair having numeric type tokens is determined by converting the tokens of the token pair to their numeric values, setting the similarity score to zero for the matched token pair when the numeric values are not equivalent, and setting the similarity score for the matched token pair to one when the numeric values are equivalent.

25. The computer-readable medium of claim 23, wherein the token similarity score for each matched token pair having alpha-numeric type tokens is determined by setting the similarity score to zero for the matched token pair when the tokens are not exact duplicates, and setting the similarity score for the matched token pair to one when the tokens are duplicates.

26. The computer-readable medium of claim 23, wherein the token similarity score for each matched token pair is determined by determining whether the length of a token of the matched token pair is less than a threshold length and, if so, setting the similarity score for the matched token pair to zero if the tokens are not an exact match.

27. The computer-readable medium of claim 23, wherein the token similarity score for each matched token pair having alphabetic tokens is set to a value of an edit distance between the two tokens, wherein the value of the edit distance is calculated by subtracting the length of the unmatched substrings between the two tokens from the length of the longer token, and dividing the result by the length of the longer token.

28. A method for determining a likelihood of two documents describing similar subject matter, the method comprising:
    obtaining a set of tokens for each of a first and a second document, wherein each set of tokens represents a series of characters found in its corresponding document;
    obtaining a set of matched token pairs, each matched token pair comprising a first token from the set of tokens corresponding to the first document and a second token from the set of tokens corresponding to the second document; wherein the second token matches the first token; wherein each matched token pair has a term frequency—inverse document frequency (TFIDF) score and an edit distance score; wherein the TFIDF score represents an average of the number of times each token of the matched token pair appears in its respective document times a harmonic mean of an inverse document frequency in a document corpus of each token of the matched token pair; and wherein the edit distance score represents a relative similarity of the matched token pair;
    determining a similarity score for the first and second documents according to the token similarity scores of the token pairs in the set of matched token pairs by dividing a weighted common similarity score by the sum of a matched tokens TFIDF score and an unmatched tokens TFIDF score, wherein:
        the weighted common similarity score comprises a sum of a product of each TFIDF score and each edit distance score for the token pairs in the set of matched token pairs;
        the matched tokens TFIDF score comprises a sum of each TFIDF score for the token pairs in the set of matched token pairs; and
        the unmatched tokens TFIDF score comprises a sum of each TFIDF score for each unmatched token of the first document; and
    providing the determined similarity score as the likelihood of the first and second documents describing similar subject matter.

29. The method of claim 28, wherein the unmatched tokens TFIDF score comprises a sum of each TFIDF score for each unmatched token of the first document plus a sum of each TFIDF score for each unmatched token of the second document.

* * * * *